United States Patent
Jensen et al.

(10) Patent No.: US 7,105,085 B2
(45) Date of Patent: Sep. 12, 2006

(54) DEVICE FOR BIOLOGICAL FLUID TREATMENT

(75) Inventors: Erik Jensen, Tjele (DK); Jens Christian Paulsen, Bjerringbro (DK)

(73) Assignee: Grundfos A/S, Bjerringbro (DK)

( * ) Notice: Subject to any disclaimer, the term of this patent is extended or adjusted under 35 U.S.C. 154(b) by 68 days.

(21) Appl. No.: 10/479,209

(22) PCT Filed: May 24, 2002

(86) PCT No.: PCT/EP02/05749

§ 371 (c)(1),
(2), (4) Date: Jun. 8, 2004

(87) PCT Pub. No.: WO02/094724

PCT Pub. Date: Nov. 28, 2002

(65) Prior Publication Data
US 2004/0232070 A1  Nov. 25, 2004

(30) Foreign Application Priority Data
May 25, 2001 (EP) .................................. 01112677

(51) Int. Cl.
*C02F 3/08* (2006.01)
(52) U.S. Cl. .................................... 210/150; 210/619
(58) Field of Classification Search ................ 210/150, 210/151, 619, 209
See application file for complete search history.

(56) References Cited

U.S. PATENT DOCUMENTS

| | | | |
|---|---|---|---|
| 3,335,081 A * | 8/1967 | El-Naggar | 210/150 |
| 3,466,241 A | 9/1969 | Simpson | |
| 3,598,726 A * | 8/1971 | Welch | 210/151 |
| 3,997,443 A * | 12/1976 | Thissen | 210/150 |
| 4,126,545 A * | 11/1978 | Hagiwara | 210/619 |
| 4,162,195 A * | 7/1979 | Solyom et al. | 210/96.1 |
| 4,345,997 A * | 8/1982 | McConnell et al. | 210/150 |
| 4,999,302 A * | 3/1991 | Kahler et al. | 210/619 |
| 5,281,335 A * | 1/1994 | Kuhn | 210/151 |
| 6,585,886 B1 | 7/2003 | Luehr | |

FOREIGN PATENT DOCUMENTS

| | | |
|---|---|---|
| EP | 0 381 305 A1 | 2/1990 |
| GB | 1401000 | 12/1971 |
| GB | 1492637 | 4/1975 |
| RU | 2 021 214 | 10/1994 |
| SU | 804576 * | 2/1981 |
| SU | 999214 | 4/1992 |
| SU | 1803424 | 3/1993 |

* cited by examiner

Primary Examiner—Christopher Upton
(74) Attorney, Agent, or Firm—Cohen, Pontani, Lieberman & Pavane

(57) ABSTRACT

In a device for biological fluid treatment, fluid is led along surfaces coated with microorganisms, which form parts of disks drivable about a rotation axis. The surfaces are formed by recesses lying in the disks and the disks are arranged to one another such that the leading of the fluid is effected through the recesses, and a recess of one disk is delimited in a channel-forming manner by the adjacent other disk movable relative to this.

18 Claims, 4 Drawing Sheets

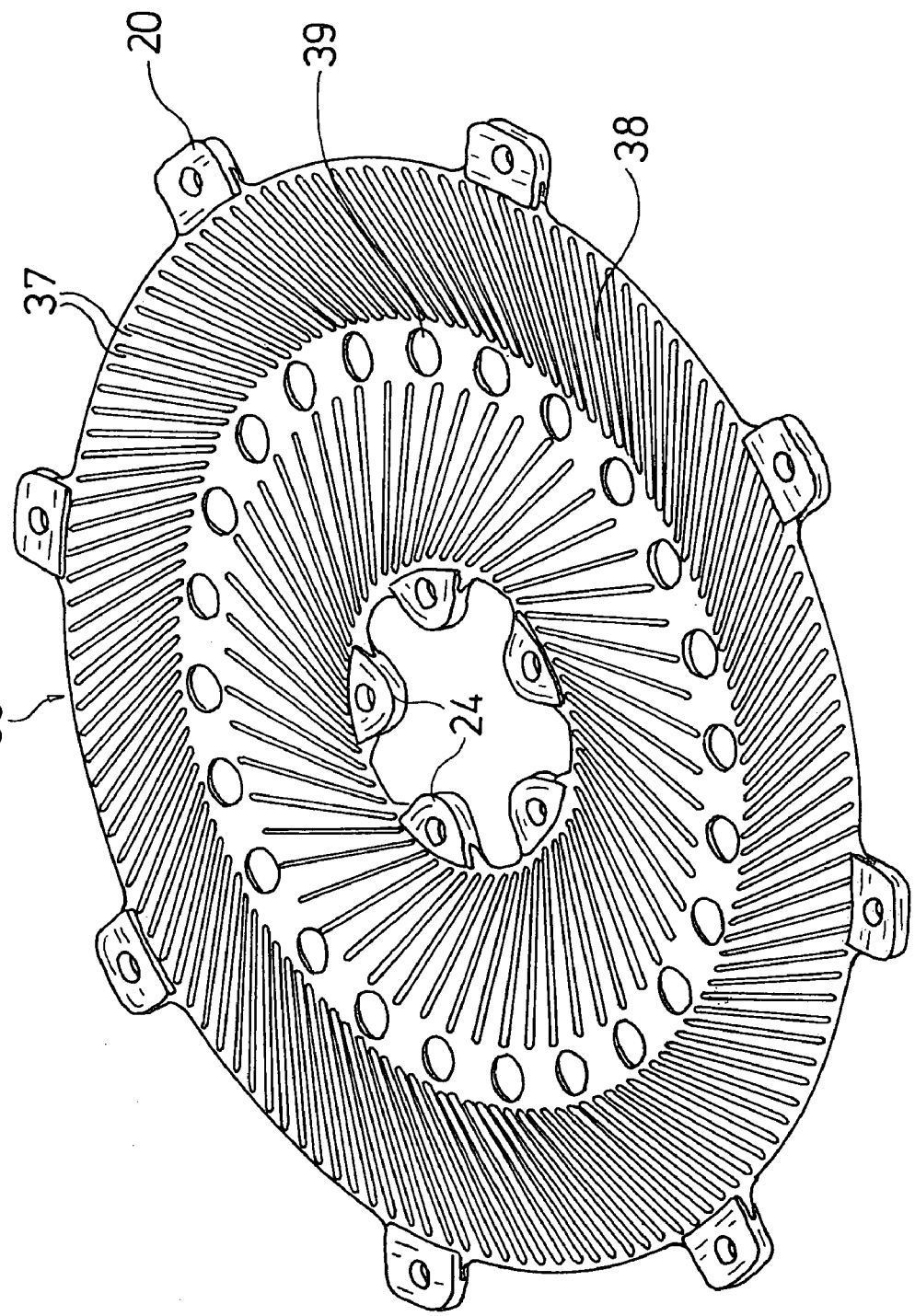

DEVICE FOR BIOLOGICAL FLUID TREATMENT

This is a U.S. national stage of application No. PCT/EP02/05749, filed on May 24, 2002. Priority is claimed on that application and on the following application(s): Country: Europe, Application No.: 01 112 677.8, Filed: May 25, 2001.

BACKGROUND OF THE INVENTION

1. Field of the Invention

The invention relates to a device for biological fluid treatment, i.e., waste water treatment, in which a fluid to be treated is led along surfaces coated with microorganisms.

2. Description of the Prior Art

Biological cleaning stages which function aerobically or anaerobically are applied in particular when treating wastewater. With this it is the case of so-called substrate biologies, i.e. of microorganisms with are fixed on a substrate material with a large surface, along which the fluid to be treated is led. Such a method is known for example from EP 0 470 931 A2.

One problem with this surface coated with microorganisms is the fact that the surface activity changes with a growing layer thickness, since with an increasing layer thickness, the microorganisms lying at the bottom are more poorly supplied, and thus may not take part so actively in the process. The excess microorganisms therefore need to be removed from the surfaces at regular intervals and the sludge which settles from this needs to be led away, which is usually effected by back-rinsing or by way of a scraper. Such scraper devices are known for example from GB 1418348 A and DE 44 41 866 A1.

A further problem with closed reactors with which the fluid is led in channels and with which the mostly filigree channel walling serves as adhering surfaces for the microorganisms lies in the fact that the channels clog with an increasing layer thickness of the microorganisms, and a through-flow occurs only with an increased resistance, by which means the activity likewise reduces. In contrast to this, with open reactors as for example are known from U.S. Pat. No. 3,466,241 A1 or U.S. Pat. No. 4,157,303 A1, the fluid flow is led past stacks of disks which form a comparatively large surface for carrying the microorganisms, which however are comparatively poorly used due to the fact that the disks are only partly immersed in the waste-water.

BRIEF SUMMARY OF THE INVENTION

Against this background it is the object of the invention to design a device for biological fluid treatment of the initially mentioned type such that as constant as possible layer thickness of the microorganisms on the adhering surface sets in.

The basic concept of the present invention on the one hand is to release the excess part of microorganisms from the adhered surface as continuously as possible and on the other hand to reliably remove this by way of a fluid flow. According to the invention this is achieved in that recesses lie in the disks and these recesses form channels which are delimited by the other disk arranged adjacent to this and movable relative to this. Thus by way of the movement of the disks to one another a simultaneous scraping as well as a renewed channel formation is effected, wherein the channel leading continuously changes due to the relative movement to one another. By way of this a continuous operation with an exactly controllable reaction process is possible.

At the same time it is important to obtain a growth basis for the further microbiological process. For this, the surfaces on which the microorganisms settle are preferably of a porous material or one having roughnesses and/or are structured on their surface. At the same time the surface structuring itself may already be channel-forming or however may be additionally provided within the channel. Preferably the recesses or the channels formed by these are formed by grooves in a disk. The surface of these grooves and the bordering adjacent disk then forms the surface coated with microorganisms, which for its part is preferably porous, rough or surface-structured.

The grooves at the same time are designed open towards the oppositely lying disk so that this oppositely lying disk together with the groove forms a channel for leading fluid. The grooves may basically be provided in one disk, the adjacent disk on its oppositely lying side is thus formed plane, it is also sufficient if adjacent disks overlap only in sections, preferably however the disks are arrange coaxially and/or formed annularly with grooves on both sides. Then a central fluid supply may be effected through the inner opening of the plate stack and the removal may be effected via the outer side or vice versa. With this, the grooves are essentially radial or at least are also aligned radially, for example such that the groove-delimiting edges of disks lying opposite one another are arranged such that on rotation they always meet at the same angle.

A particularly compactly constructed and effectively acting device is obtained in that there are provided two disk or plate stacks arranged coaxially to one another, which are provided with grooves on both sides, wherein the disks are alternately allocated to the respective stacks and one stack is stationary and the other stack is rotating. This may be achieved in a simple manner in that the annular disks of the one stack comprise at least one section arranged on the inside with which they are fastened within the stack, for example via an inner shaft setting this stack into rotation, and the respective adjacent disks of the other stack in each case comprise at least one section arranged on the outside, with they are fixed within this stack. Inasmuch as the drive is effected via a central shaft, it is useful to fasten the sections arranged on the inside on the shaft or on a carrier arranged on the shaft and to connect the outer sections to one another rigid with the housing. This may however also be effected in the reverse manner.

Advantageously the disks of both stacks comprise one or more openings which may be brought flush with one another, via which a gas, in particular air/oxygen may be supplied. The admixture of air-oxygen is then effected essentially parallel to the common axis of the stacks in order then to be deflected by about 90° in the region of a disk and to flow essentially radially outwards together with the fluid flow. At the same time the arrangement is such that on the end side there are provided suitable terminations or connections by way of which the gas is supplied or the uncontrolled exit at the end is prevented.

One preferred embodiment form with which two plate stacks with grooves lying in their surfaces mesh with one another and the guiding of fluid is effected centrally from the inside to the outside is not only compact in construction but may also be additionally applied in existing waste-water treatment installations, such as for example sewage basins in order to increase the capacity of the installation or to reduce the treatment time. Such units may also be applied in waters such as lakes and likewise in a floating manner in order to improve the water quality.

For the stationary application on location it is useful to incorporate the device in a hermetically tight housing or to integrate it into a hermetically closable conduit system so that it is subjected to pressure with a reaction-promoting gas, for example air, in order to accelerate an aerobic reaction procedure.

BRIEF DESCRIPTION OF THE DRAWINGS

The invention is hereinafter explained in more detail by way of embodiment examples shown in the drawing. In the drawings:

FIG. 9 is a perspective view of a disk design which is selectively envisaged for fastening on the inside or outside.

DETAILED DESCRIPTION OF THE INVENTION

Figure 1:
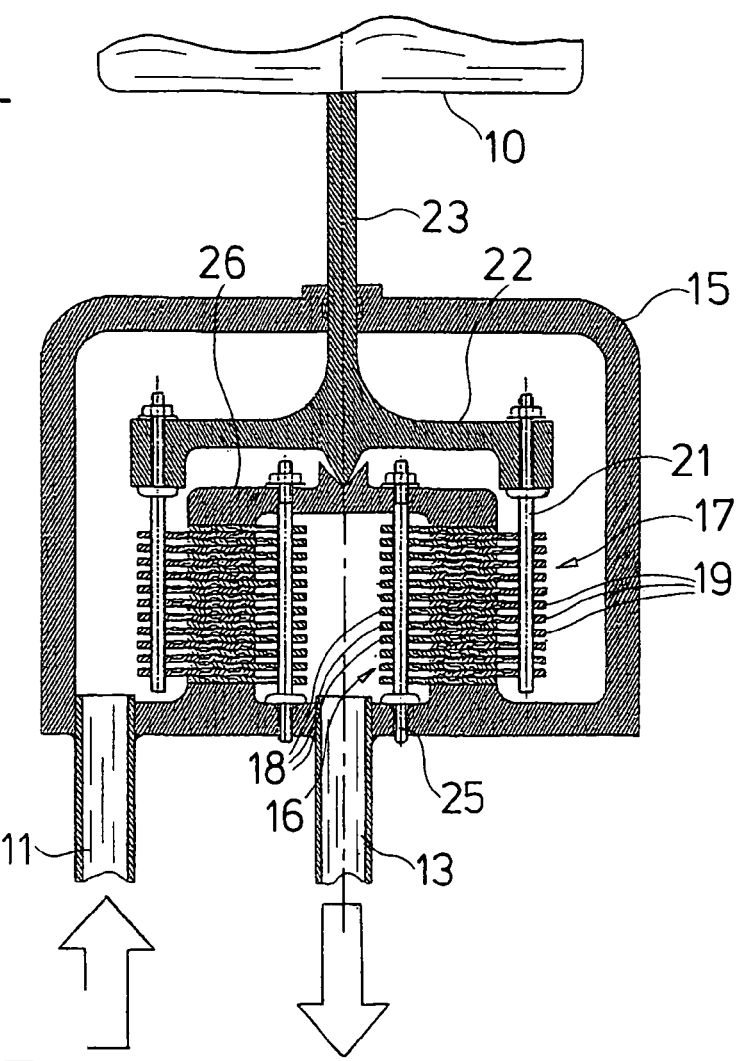
FIG. 1 is a schematic longitudinal sectional view of a device with which the surfaces coated with microorganisms are provided on two disk stacks which are in engagement with one another.
Figure 4:
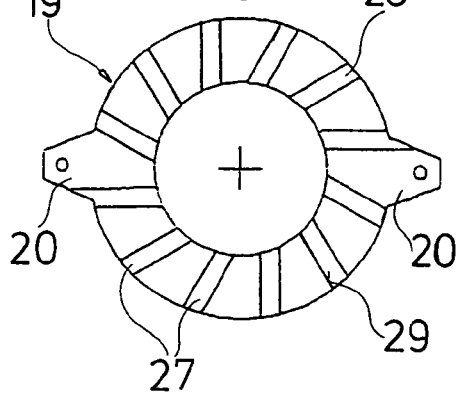
FIG. 4 is a plan view of a disk of the outer disk stack.

In FIG. 1 there is shown a receptacle which comprises an inlet channel 11 for the fluid to be treated, for example waste-water, as well as an outlet channel 13. The receptacle 15 is hermetically closed and may be impinged by pressure in order to accelerate the course of the reaction. It is to be understood that the channels 111 and 13 are then incorporated into a closed system. A shaft 23 of a motor 10 passes through the receptacle 15 at its end-face wall lying opposite the inlet and outlet channels 11 and 13. At the end of the shaft 23 there is arranged a carrier on which a stack 17 with disks 19 arranged at a distance to one another is fastened by way of fastening bolts 21. These disks 19 are annular and are shown in FIG. 4 in a plan view. On their outer circumference they comprise diametrically arranged projections 20 which are passed through by fastening bolts 21 which are fastened on the common carrier 22. The disk stack 17 arranged in this manner may be rotated by way of the motor 10 via the shaft 23 about the motor axis within the receptacle 15.

At the end-face of the essentially cylindrical receptacle 15 comprising the inlet and outlet channel 11, 13, disks 18 are clamped rigidly with the housing into a disk stack 16 between this end-face and a carrier 26 via fastening bolts 25. Here too the disks 18 are arranged at a distance to one another, they are shown individually by way of FIGS. 2 and 3. These disks 18 are likewise annular and on their inner side comprise projections 24 which are passed through by the bolts 25 and fix these. The disk stack 16 formed in this manner is thus arranged rigid with the housing, coaxially to the rotatably arranged disk stack 17. The disks 18 and 19 lie directly adjacent to one another, they mesh with one another and with this form channels between which the fluid to be treated flows from the outside to the inside.

Figure 2:
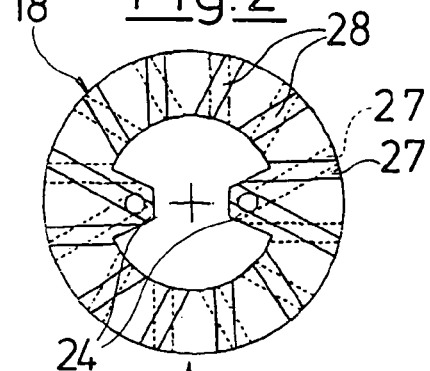
FIG. 2 is a plan view of a disk of the inner disk stack.

The disks 18 and 19 in each case have grooves 27 on both sides which have an essentially rectangular cross section and are directed essentially radially, but at a different angle as shown in FIG. 2. The disks 18 and 19 are arranged within the stacks 16 and 17 respectively at a distance such that the adjacent disk closes the grooves 27 of one disk in a channel-forming manner, but such that the disks remain easily movable to one another. The grooves 27 form surfaces 28 on which the microorganisms adhere so that the two disk stacks 16 and 17 form a multitude of channels with a comparatively large active surface with a small constructional size. The disks 18 and 19 may be manufactured inexpensively as plastic injection molded parts.

The flow through the receptacle 15 is effected from the inlet channel 11 through the grooves 27 between the disk stacks 16 and 17 into the free center towards the outlet channel 13. The surfaces 28 delimiting the grooves 27 form the surfaces carrying the microorganisms. They are preferably rough, porous or finely surface-structured so that the microorganisms adhere well to these.

The microorganisms which form on the surfaces 28 with an increasing layer thickness on operation of the device here are removed mechanically and preferably continuously by rotation of the shaft 23. Whilst the plate stack 16 fastened on inner projections 24 is stationary, the plate stack 17 fastened on the outer projections 20 rotates, wherein the edges 29 of the grooves 27 act as scrapers and release excess microorganisms which then are entrained via the through-flowing fluid and are thus removed. With this, by way of the rotation movement it is not a smooth cutting away of projecting material which is effected, but as with natural processes, sections of microorganisms are broken out so that at least a part of the channel cross section is released again, and thus may be flown through. Added to this is the fact that the processes are usually effected under pressure, since the medium to be treated as a rule is delivered through the device by way of a pump, by which means the previously described process is further encouraged. With the shown embodiment form the through-flow is effected from the outside to the inside, it may however also be effected from the inside to the outside. In any case the carrier 26 separates the outlet channel 13 from the remaining inner space of the receptacle 15 so that a through-flow may only be effected along the channels formed by the grooves 27.

Figure 3:
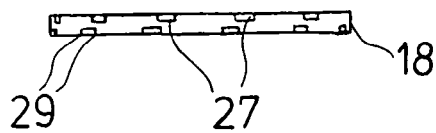
FIG. 3 is a lateral view of a disk in the direction of the arrow III in FIG. 2.
Figure 5:
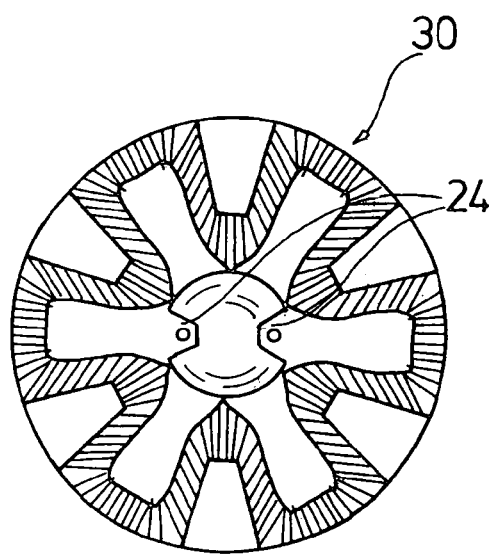
FIG. 5 is a plan view of a disk according to an alternative disk design.
Figure 6:
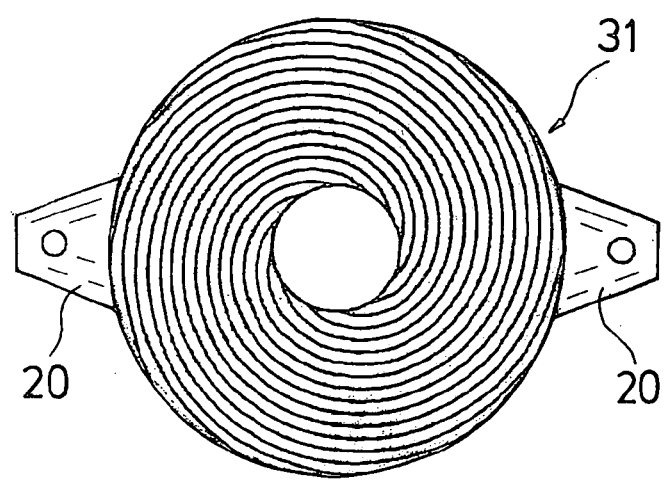
FIG. 6 is a plan view of a disk according to yet another disk design.

The grooves 27 in the annular disks 18 and 19 shown in FIGS. 2 to 4 are arranged essentially radially. FIGS. 5 and 6 show disks 30 and 31 display which have an alternative groove arrangement which mesh with one another in the same manner as described previously by way of the disk stacks 16 and 17. The disk 30 (FIG. 5) is provided with a multitude of short and essentially radial channels which however in cross section are comparatively small and which are provided in a raised part which extends roughly zig-zag-like on the disk. The disk 31 (FIG. 6) has channels which are arranged spirally. With a combination of these disks 30 and 31 there results a very constant layer thickness of microorganisms, wherein the grooves of the disks 30 form the essential flow path, whilst on the other hand the edges of the grooves of the disks 31 essentially fulfill the task of scraping away. This arrangement of disks 30 and 31 has very good lubricative properties so that comparatively high disk stacks may be formed.

In order to accelerate the treatment procedure and to achieve an even more intensive fluid treatment, it is useful additionally to further supply gas, in particular air-oxygen (surrounding or ambient air). For this the disks of the individual disk stack may additionally be provided with bores as this is shown by way of example by way of the disk 36 in FIG. 9. This disk 36 is likewise formed annular and as an injection molded part. It comprises inner projections 24 as well as outer projections 20 so that such a disk 36 may be applied for the one as well as the other disk stack. The respective projections 20 or 24 which are not required are removed with the help of an auxiliary instrument.

Figure 8:
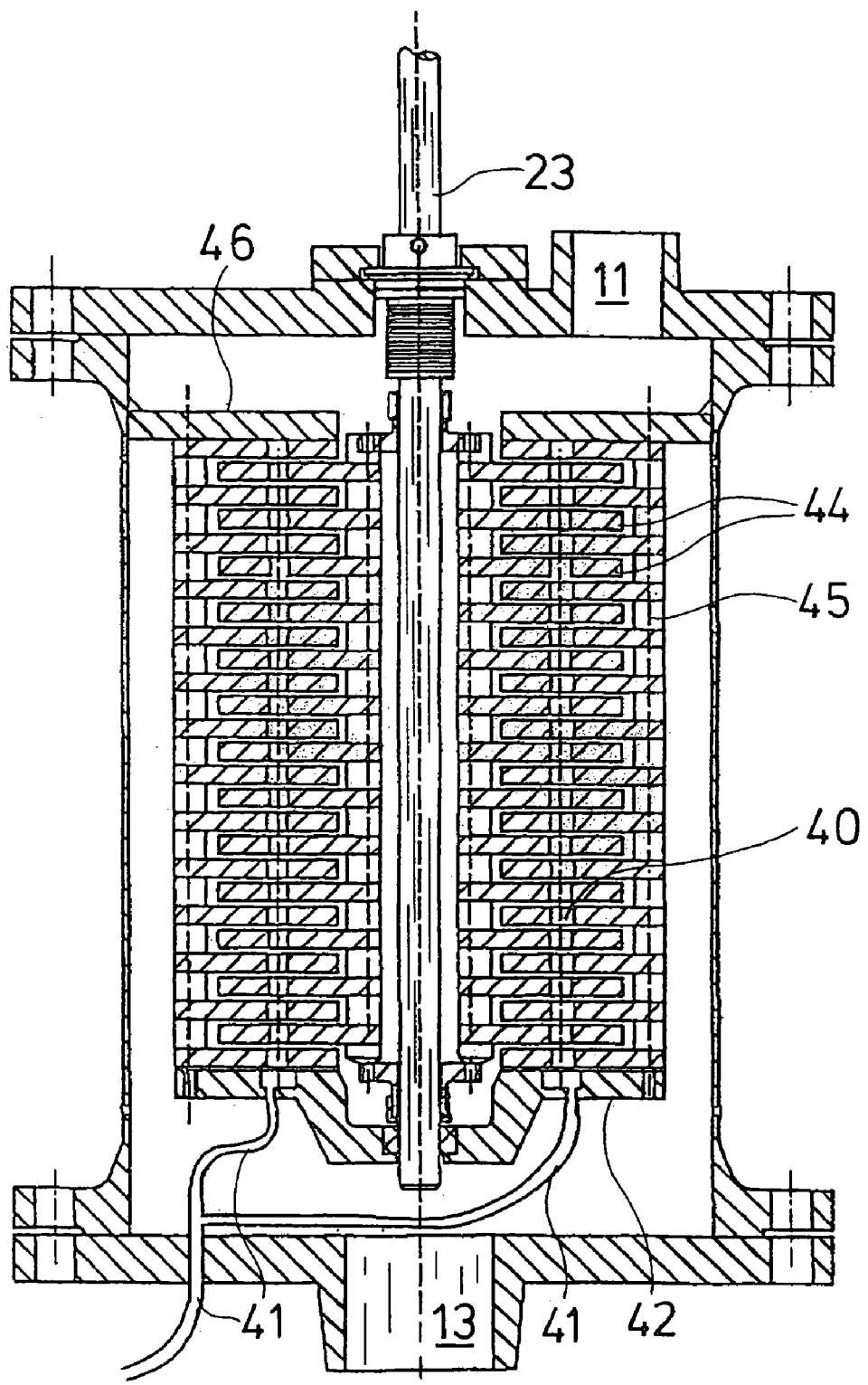
FIG. 8 is a schematic longitudinal sectional view a device likewise functioning with two disk stacks arranged coaxially to one another, in a longitudinal section with an additional gas supply.

As the illustration according to FIG. 9 makes clear, the grooves formed in the disk 36 are formed with a larger surface than with the embodiment form previously described by way of FIGS. 1 to 4, they are formed by essentially radially running webs 37 and 38 which are arranged at a different angle to one another but otherwise however are arranged in rows equally directed to the rotational axis of the disk 36. Between the two rows of webs 37 and 38 there is provided a series of openings 39 which are formed by a ring of circular holes. Referring also to FIG. 8, the openings 39 which are provided in all disks of two stacks, as soon as they are flush in the corresponding rotational position, form central transverse channels 40 through which air/oxygen may be led. The inflow of air/oxygen is effected via conduits 41 which open into the stationary carrier 42 of the stationary disk stack. The disks 36 on their outer side are formed just as on the upper side visible in FIG. 9.

Two such disk stacks meshing with one another are shown in the device shown in a longitudinal section in FIG. 8. Here too the device has an essentially cylindrical receptacle 43 on whose one end-face side there is arranged an inlet channel 11 as well as a lead-through and mounting of the shaft 23, and whose other end-face side comprises the outlet channel 13. The rotating disk stack 44 is fastened on the shaft 23 within the receptacle 43; the stationary disk stack 45 is incorporated between the carrier 42 and the carrier 46. The disks of both stacks correspond to that described by way of FIG. 9, in each case with one of the inner or outer projections 24, 20 removed. With this embodiment form there result through-flow channels which are larger in cross section since almost the entire disk surface may be flown through with the exception of the web surfaces 38 and 39. The supply of air/oxygen quasi at half the path of the flow through the stack is particularly favorable since for the initial treatment as a rule sufficient oxygen is still available by way of entraining, so that this supply in the middle is particularly effective for the fluid treatment.

Figure 7:
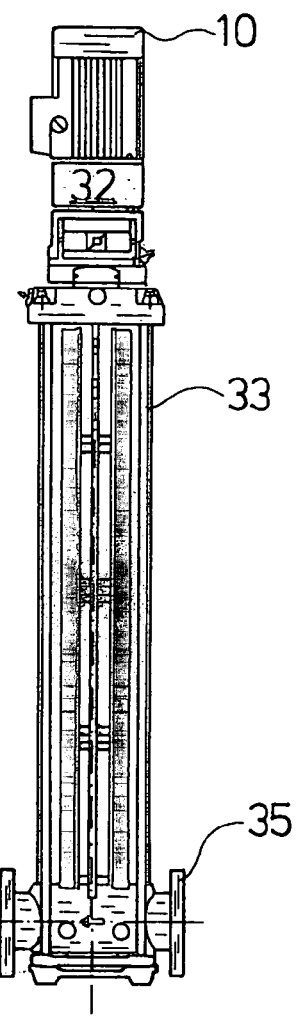
FIG. 7 is a side view of the device of FIG. 1 with inline connections.

FIGS. 1 and 8 represent essentially the basic device construction. FIG. 7 shows how such a device may look in practice. Here one may use a standard motor 10 with a gear 32 arranged after this, to which a receptacle 33 is flanged with the same axis, said receptacle being designed essentially tubular and may have a length for example of one meter. The disk stack is arranged within this tube section 33. The hydraulic connection of the device is effected at the lower end by way of two flanges 34 and 35 lying inline as an inlet and outlet.

As already indicated previously, the device according to the invention with a suitable design may also be applied additionally in existing (open) waste-water treatment installations or also in water masses. One only needs provide suitable means for conveying the fluid to be treated through the device. For this, as a rule a centrifugal pump is sufficient, which conveys the fluid through the device.

The invention claimed is:

1. A device for treatment of a biological fluid, comprising a plurality of disks, each of said plural disks comprising recesses forming surfaces coated with microorganisms, said plural disks being arranged relative to one another such that the biological fluid flowing through said device passes through said recesses, a recess in one of said plural disks is delimited by a surface on an adjacent disk to form a channel, and said adjacent disk being movable relative to said one of said plural disks about an axis of rotation, wherein said recesses are defined by grooves in said plural disks which extend substantially radially such that said channels extend from a radially inner side of said one of said plural disks to a radially outer side of said one of said plural disks.

2. The device of claim 1, wherein said surfaces coated with microorganisms comprise one of porous, rough, or surface-structured surfaces.

3. The device of claim 1, wherein each of said plural disks comprises an annular shape and said plurality of disks are arranged in a stack.

4. The device of claim 3, wherein said plurality of disks include a first set of disks and a second set of disks, said disks from said first set of disk being alternately stacked with said disks from said second set of disks.

5. The device of claim 4, wherein said first set of disks is coaxially arranged with said second set of disks.

6. The device of claim 4, wherein said first set of disks is stationary and said second set of disks is rotatable about an axis of rotation.

7. The device of claim 1, wherein said disks comprises through holes which are alignable, such that a gas is suppliable through said through holes.

8. The device of claim 1, further comprising a receptacle in which said plurality of disks are arranged, wherein said receptacle is subjected to a pressure by a reaction-promoting gas.

9. The device of claim 1, wherein said microorganisms are microorganisms for treating waste-water.

10. The device of claims 1, wherein said disks are arranged and dimensioned so that movement of said adjacent disk relative to said one of said plural disks removes excess ones of said microorganisms in said recesses.

11. The device of claim 1, wherein said adjacent disk is movable such that said surface of said adjacent disk moves relative to said recess of said one of said plural disks.

12. A device for treatment of a biological fluid, comprising a plurality of disks, each of said plural disks comprising recesses forming surfaces coated wit microorganisms, said plural disks being arranged relative to one another such tat the biological fluid flowing through said device passes through said recesses, a recess in one of said plural disks is delimited by a surface on an adjacent disk to form a channel, and said adjacent disk being movable relative to said one of said plural disks about an axis of rotation, wherein each of said plural disks comprises an annular shape and said plurality of disks are arranged in a stack, said plurality of disks include a first set of disks and a second set of disks, said disks from said first set of disk being alternately stacked wit said disks from said second set of disks, said first set of disks being stationary and said second set of disks being rotatable about an axis of rotation, wherein said disks in said second set of disks comprise a radially outward projection, said second set of disks being fastened together by said radially outward projections.

13. The device of claim 12, wherein said recesses comprise grooves in said plural disks.

14. The device of claim 13, wherein said grooves extend substantially in a radial direction and said channel extends from a radially inner side of said one of said plural disks to a radially outer side of said one of said plural disks.

15. The device of claim 12, wherein said disks in said first set of disks comprise a radially inward projection, said first set of disks being fastened together by said radially inward projections.

16. A device for treatment of a biological fluid, comprising a plurality of disks, each of said plural disks comprising recesses forming surfaces coated wit microorganisms, said plural disks being arranged relative to one another such that the biological fluid flowing through said device passes through said recesses, a recess in one of said plural disks is delimited by a surface on an adjacent disk to form a channel, and said adjacent disk being movable relative to said one of said plural disks about an axis of rotation, wherein each of said plural disks comprises an annular shape and said plurality of disks are arranged in a stack, said plurality of disks include a first set of disks and a second set of disks, said disks from said first set of disk being alternately stacked with said disks from said second set of disks, said first set of disks being stationary and said second set of disks being rotatable about an axis of rotation, wherein said disks in said first set of disks comprise a radially inward projection, said first set of disks being fastened together by said radially inward projections.

17. The device of claim 16, wherein said recesses comprise grooves in said plural disks.

18. The device of claim 17, wherein said grooves extend substantially in a radial direction and said channel extends from a radially inner side of said one of said plural disks to a radially outer side of said one of said plural disks.

* * * * *